(No Model.)

C. W. NICHOLSON.
PEANUT CLEANER AND POLISHER.

No. 290,914. Patented Dec. 25, 1883.

WITNESSES:
W. W. Hollingsworth
A. G. Lyne.

INVENTOR:
C. W. Nicholson
BY Munn & Co
ATTORNEYS.

UNITED STATES PATENT OFFICE.

CHARLES W. NICHOLSON, OF ASSAMOOSICK, VIRGINIA.

PEANUT CLEANER AND POLISHER.

SPECIFICATION forming part of Letters Patent No. 290,914, dated December 25, 1883.

Application filed September 27, 1883. (No model.)

*To all whom it may concern:*

Be it known that I, CHARLES W. NICHOLSON, of Assamoosick, in the county of Southampton and State of Virginia, have invented a new and useful Improvement in Peanut Cleaners and Polishers, of which the following is a full, clear, and exact description, reference being had to the annexed drawings, forming part of this specification.

This invention relates to an improvement upon the peanut cleaner and polisher shown in Letters Patent No. 242,680, granted to Chas. W. Nicholson and Richard H. Leigh under date of June 7, 1881. In said patent is shown a hollow cylinder formed of parallel slats, through which cylinder the peanuts are run to shake out through the open spaces therein dirt and other impurities adhering to them.

My present invention consists of the peculiar combination, with such a cylinder, of a cylindrical brush, which is arranged therein and geared to run in a direction opposite to that of the cylinder, as hereinafter described and claimed.

Figure 1:
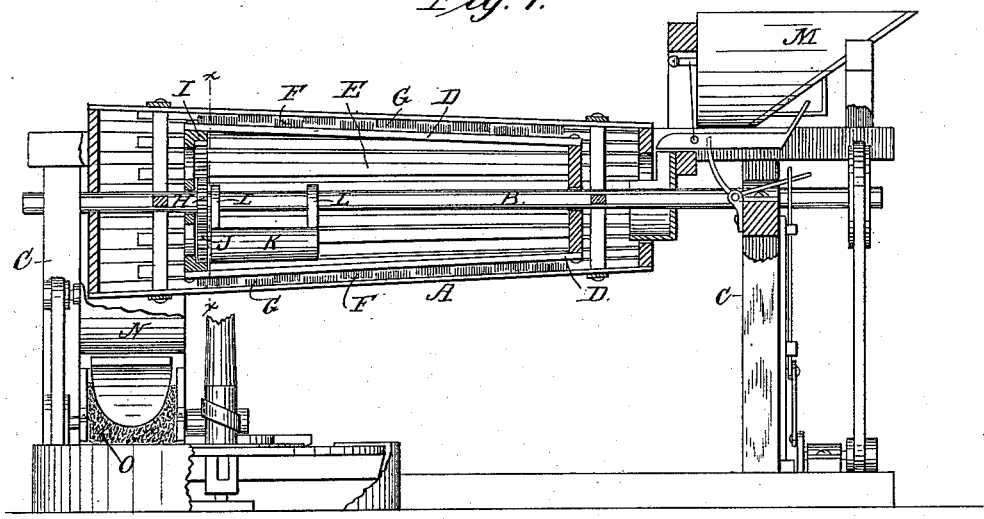
Figure 2:
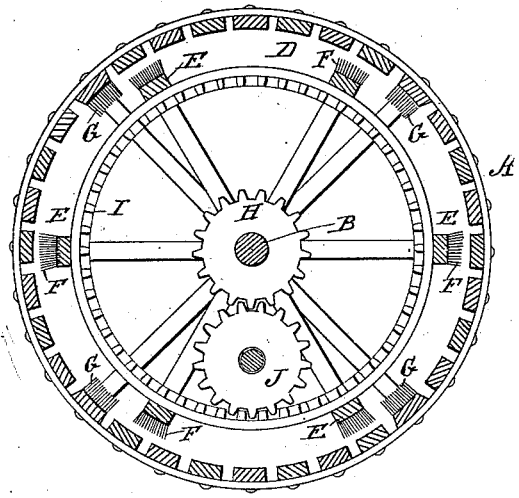

In the drawings, Figure 1 is a side elevation of a peanut cleaner, polisher, and assorter, partly in section and broken away, showing my present invention; and Fig. 2 is an enlarged cross-section of the cleaning-cylinder on line *x x* of Fig. 1, showing my invention.

The cleaning-cylinder A is rigidly secured to a central shaft, B, supported in the frame C, and is to be rotated by means of a belt, as described in the above-named patent. Within this cylinder is arranged a brush, D, formed of slats E, arranged in the shape of a hollow cylinder, which is loosely mounted on the shaft B. The slats E are provided with tufts, F, of suitable (preferably stiff) brush material, which extend outwardly and nearly in contact with the inner surface of the cylinder A. If desired, tufts G may also be attached to some of the slats of the cylinder A and arranged to extend inwardly toward the brush D. These two cylinders are to be rotated in opposite directions, so as to subject the peanuts in their passage between the same to sufficient friction to clean and also to polish the hulls.

I have shown the shaft B provided with a pinion, H, which is rigidly secured thereto, and the brush D is provided with a gear-wheel, I, loosely mounted on the shaft B, and having a concave circular series of teeth, which are geared with the pinion H by an intermediate pinion, J, journaled on the end of a weight, K, which is suspended by hangers L, loosely mounted on the shaft B. The weight serves to keep the pinion J immediately under the pinion H, and the pinion J communicates a motion to the wheel I in a direction opposite to that of the pinion H. Opposite movements are thus given to the cylinder A and brush D. Any other suitable epicyclic train may be used.

M indicates the hopper at the feed end of the cylinder A; and N is a fan, and O a polishing-brush, as shown in the above-named patent. The function and operation of the latter are not affected by my improvement above described, and the general construction of the machine will be readily understood by referring to the said patent.

What I claim is—

The combination of the supporting-shaft, the cleaning-cylinder rigidly secured to the shaft, the cylindrical brush arranged within the said cylinder and loosely mounted on said shaft, the weight loosely suspended from said shaft, and the epicyclic train of gears, substantially as shown and described.

CHARLES W. NICHOLSON.

Witnesses:
 A. G. LYNE,
 SOLON C. KEMON.